United States Patent
Barsuk

(10) Patent No.: US 7,350,065 B2
(45) Date of Patent: Mar. 25, 2008

(54) METHOD, APPARATUS AND PROGRAM STORAGE DEVICE FOR PROVIDING A REMOTE POWER RESET AT A REMOTE SERVER THROUGH A NETWORK CONNECTION

(75) Inventor: Vyacheslav Barsuk, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 10/736,429

(22) Filed: Dec. 15, 2003

(65) Prior Publication Data

US 2005/0132237 A1    Jun. 16, 2005

(51) Int. Cl.
*G06F 9/00* (2006.01)
*G06F 9/24* (2006.01)
*G06F 15/177* (2006.01)

(52) U.S. Cl. .............................................. 713/1; 713/2
(58) Field of Classification Search ............ 713/1, 713/2
See application file for complete search history.

(56) References Cited

U.S. PATENT DOCUMENTS

| | | | |
|---|---|---|---|
| 6,138,150 A | 10/2000 | Nichols et al. ............ 709/219 |
| 6,163,849 A | 12/2000 | Nouri et al. | |
| 6,202,160 B1 | 3/2001 | Sheikh et al. | |
| 6,301,634 B1 * | 10/2001 | Gomi et al. ............... 710/267 |
| 6,330,690 B1 | 12/2001 | Nouri et al. | |
| 6,611,915 B1 * | 8/2003 | Kubik et al. ............... 709/211 |
| 6,651,190 B1 * | 11/2003 | Worley et al. ............... 714/43 |
| 6,697,033 B1 * | 2/2004 | Leung et al. ................. 345/5 |
| 6,871,286 B1 * | 3/2005 | Cagle et al. .................. 726/5 |
| 2002/0078340 A1 | 6/2002 | Baitinger et al. | |
| 2004/0141461 A1 * | 7/2004 | Zimmer et al. ............. 370/216 |
| 2004/0204245 A1 * | 10/2004 | Le Pennec et al. ......... 709/245 |
| 2004/0267918 A1 * | 12/2004 | Guarraci et al. ............ 709/223 |
| 2005/0060529 A1 * | 3/2005 | Chen ............................. 713/2 |

FOREIGN PATENT DOCUMENTS

| | | |
|---|---|---|
| JP | 07-030565 | 1/1995 |
| JP | 2000-148629 | 5/2000 |

OTHER PUBLICATIONS

International Business Machines Corporation Research Disclosure, Jun. 2000 n434124 p. 1108: "Remote automated monitoring and troubleshooting of server services and applications."
International Business Machines Corporation Research Disclosure, Dec. 1999 n428127 p. 1694: "Automatic Restart of DCE through Tivoli Management Environment."
International Business Machines Corporation Research Disclosure, Oct. 2001 n450133 p. 1776: "Method for automatically configuring static network addresses in a server blade environment."

* cited by examiner

*Primary Examiner*—Rehana Perveen
*Assistant Examiner*—Michael J Brown
(74) *Attorney, Agent, or Firm*—Arthur J. Samodovitz

(57) ABSTRACT

A method, apparatus and program storage device for performing a remote power reset at a remote server through a network connection is disclosed. A power reset procedure is pinned to memory at a remote server. The remote server listens for a call specifying the power reset procedure pinned to memory. The call is received at the predetermined port. The power reset procedure pinned in the memory of the remote server is initiated in response to the call.

16 Claims, 5 Drawing Sheets

METHOD, APPARATUS AND PROGRAM STORAGE DEVICE FOR PROVIDING A REMOTE POWER RESET AT A REMOTE SERVER THROUGH A NETWORK CONNECTION

BACKGROUND OF THE INVENTION

1. Field of the Invention

This invention relates in general to server reliability, and more particularly to a method, apparatus and program storage device for performing a remote power reset at a remote server through a network connection.

2. Description of Related Art

Distributed computing systems are generally well known. Such systems allow communications between application programs hosted on numerous computer workstations. There are numerous types of distributed computing systems, often classified by the geographical extent of their communication capability. Terms used to classify the geographical breadth of distributed computing systems are, for example: local area networks (LANs), metropolitan area networks (MANs), and wide area networks (WANs).

Many of the more popular distributed computer systems employ a file server ("server"). A host within the server manages files or data. Servers are particularly beneficial in allowing workstations fast access to files stored by the server. An important aspect of maintaining host functions within a server is to manage the host from a site remote from the host and, more specifically, to manage the server and/or host at a site remote from the server. Recent trends have seen a steady increase in the number of servers used in business. Nowadays, servers are liberally used possibly at each location of a business entity—rather than employing a centralized mainframe at one location. Unfortunately, funds available to administer many servers located at disparate locations are decreasing. While data placed on these servers is considered critical to the business, there remains insufficient means for ensuring their proper operation from a single service site. An expectation that an administrator travel to remote server sites to fix a problem is not only impractical but also quite costly given the expense associated with server downtime.

Many operating systems, or applications associated with those operating systems, allow access to a host from a remote site. Often this is referred to as a "virtual terminal". A virtual terminal, while not physically connected to the host, nonetheless allows remote control of certain operations of the host. Products have attempted to address some of the issues involved in managing a network of distributed servers from a single, remote site. These products allow, inter alia, an administrator to be alerted as to a remote server failure and to access certain information provided on the server console. In a networked system, different processes may communicate with each other. For example, each process that wants to communicate with another process may identify itself to a TCP/IP protocol suite by one or more ports. Sockets using the TCP protocol are either active or passive. Active sockets initiate connections to passive sockets. By default, TCP sockets are created active. To create a passive socket, the socket is bound with the bind( ) system call, and then the listen( ) system call is used to tell the kernel to start listening for incoming connections to the IP/Port that was bound with the bind( ) system call. The accept( ) call returns control to a program when data arrives on the designated TCP port.

When a server runs out of virtual memory because of application memory consumption, the server may become frozen or hang. Theoretically, all programs that are still running and that don't require additional computer resources will continue to run. The basic functionality of some components may be guaranteed by pinning a program/process to memory. Pinning generally refers to an ability for pages to remain in main memory and not have to be swapped out, typically by a computer operating system. This enables memory pages to be maintained in real memory all the time. However, if a program/process is not pinned to memory (normally it is not), the program/process competes for memory resources with other programs. However, as soon as a new resource is required, e.g., memory, the program will fail. When the program fails, new users can't login into the affected server any more, programs can't be restarted, etc. This situation is similar to the situation when a user needs to hit "ctrl+alt+del" in the windows operating system.

Accordingly, the only way to restore a server is to reboot it by resetting the power to the server. Rebooting by resetting the power becomes a huge problem in case of remotely located servers. To reset power remotely, additional hardware is normally required or the server must have built in hardware features, such as certain models of IBM pSeries™ servers. However, in both cases installation of additional communication equipment is required.

It is certainly beneficial to allow remote control of certain server functions. Any downtime caused by server failure is probably the most costly time involved in running a distributed computer system. If a server hangs, for example, then file access is often lost and business records are temporarily inaccessible until the server is reset. A true benefit would result if an administrator located remote from the server could initiate a remote requested action at a remote server through a network connection.

It can be seen then that there is a need for a method, apparatus and program storage device for performing a remote power reset at a remote server through a network connection.

SUMMARY OF THE INVENTION

To overcome the limitations in the prior art described above, and to overcome other limitations that will become apparent upon reading and understanding the present specification, the present invention discloses a method, apparatus and program storage device for performing a remote power reset at a remote server through a network connection.

The present invention solves the above-described problems by pinning a power reset procedure to memory at a remote server. The remote server listens for a call specifying the power reset procedure pinned to memory. The call is received at the predetermined port. The power reset procedure pinned in the memory of the remote server is initiated in response to the call. The power reset procedure has very small memory requirements and is pinned to memory to ensure it continues to run and thus is accessible by the user. When a program/process is pinned to memory, the program/process has its own memory allocated for it and no other program/process can use it. The combination of small size and the ability to be pinned into memory ensures that the power reset procedure will be one of the last programs/processes to halt.

A method, apparatus or program storage device in accordance with an embodiment of the present invention pins a power reset procedure to memory at a remote server and continuously runs the power reset procedure to listen for a call to initiate a power reset in response thereto.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for performing a remote power reset at a remote server through a network connection. For example, the remote server may perform a power reset in response to receiving such request through a call without any additional hardware. Thus, the method is compatible with wide range of servers and is performed via software.

Figure 1:
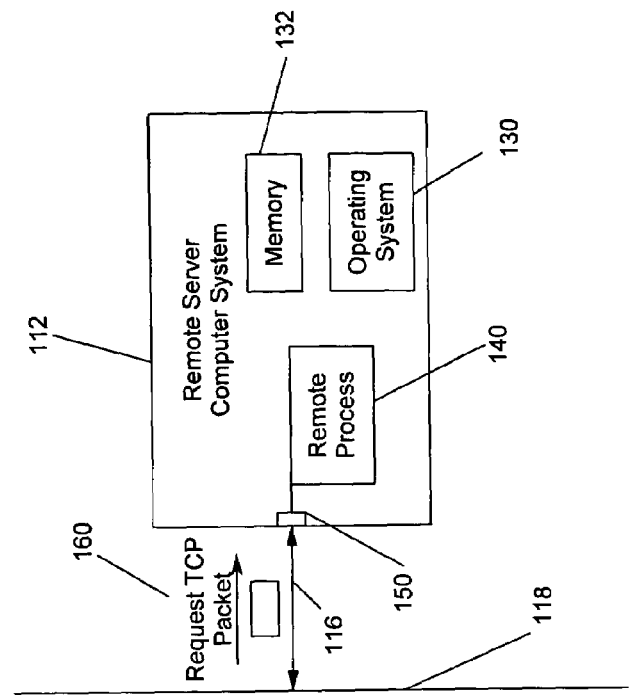
FIG. 1 illustrates a simplified network configuration of a system according to an embodiment of the present invention.
Figure 1:
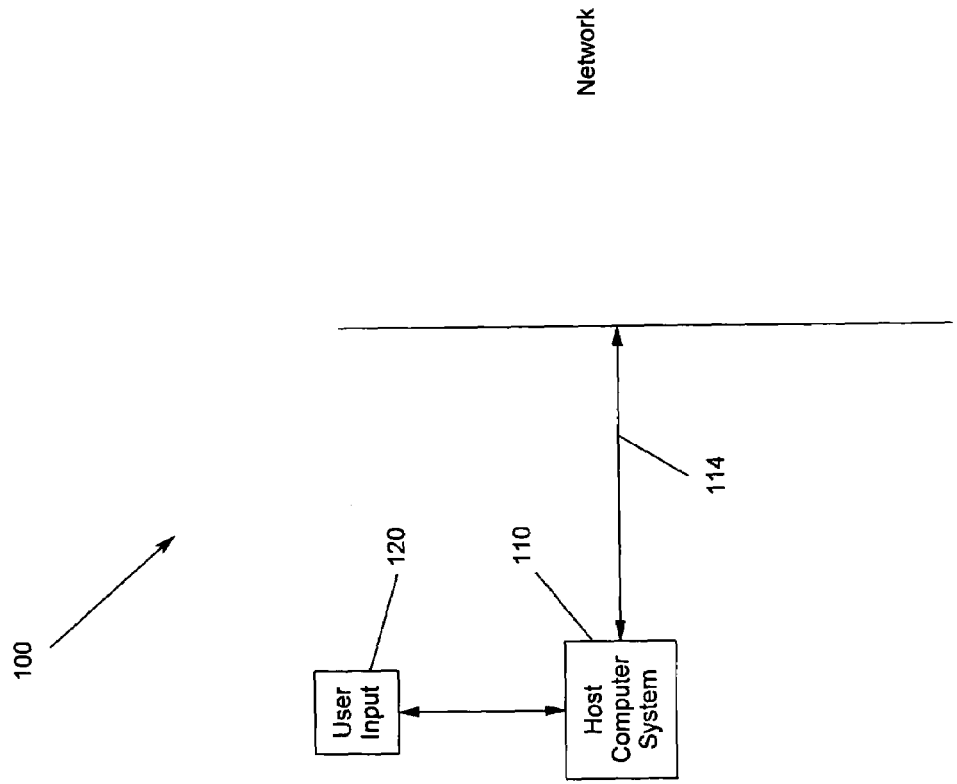

FIG. 1 illustrates a simplified network configuration 100 of a system according to an embodiment of the present invention. A host or client computer system 110 communicates with a remote server computer system 112 over a network 118. The host computer system 110 communicates with the network using network connection 114. Similarly, the remote server computer system 112 communicates with the network 118 using a network connection 116. The host computer system 110 may comprise an operating system and may be coupled to the remote server computer system 112 for providing remote power reset of the remote server computer system 112 through the network 118. Such control may be directed through user input 120. As will be described in more detail, the configuration of the system of FIG. 1 may be used to perform a request from a host to perform some specified action, such as a remote power reset of a remote server computer system 112, by sending a message on the network 118 between the host computer systems 110 and the remote server computer system 112.

When a remote server 112 runs out of memory 132, the operating system 130 starts to halt programs/processes running on the remote server 112 that require additional memory, and the larger programs tend to be terminated first. If program/process running on the remote server 112 is not pinned to memory 132 (normally it is not), the program/process competes for memory 132 with other programs. If the program/process is pinned to memory 132, the program/process has its own memory allocated for it and no other program/process can use it. To ensure that the remote server 112 continues to be able to be accessed by a user 120, a remote control process 140 is provided at the remote server 112. The remote control process 140 is a small program running on the remote server 112 and is pinned to memory 132. By way of example, the small program 140 require very little memory and depending upon the implementation may, for example, typically comprise less than 2 memory pages, i.e., 8192 bytes. However, as indicated, the present invention is not meant to be limited to a particular size. Program 140 responds to calls, such as a TCP/IP request, as described below.

The remote control process 140 has very small memory requirements and is pinned to memory 132 to ensure it continues to run and thus is accessible by the user 120. The combination of small size and the ability to be pinned into memory 132 ensures that the remote control process 140 will be one of the last programs/processes to halt. This means that the remote control process 140 will be able to listen for reboot/power off requests and to perform that request. To perform an action requested by user 120, the remote server computer system 112 checks the request, authenticates the request, analyzes the request and, if authorized, performs the request. For example, the remote server computer system 112 may perform a system call to reboot or power off the remote server computer system 112.

Figure 2:
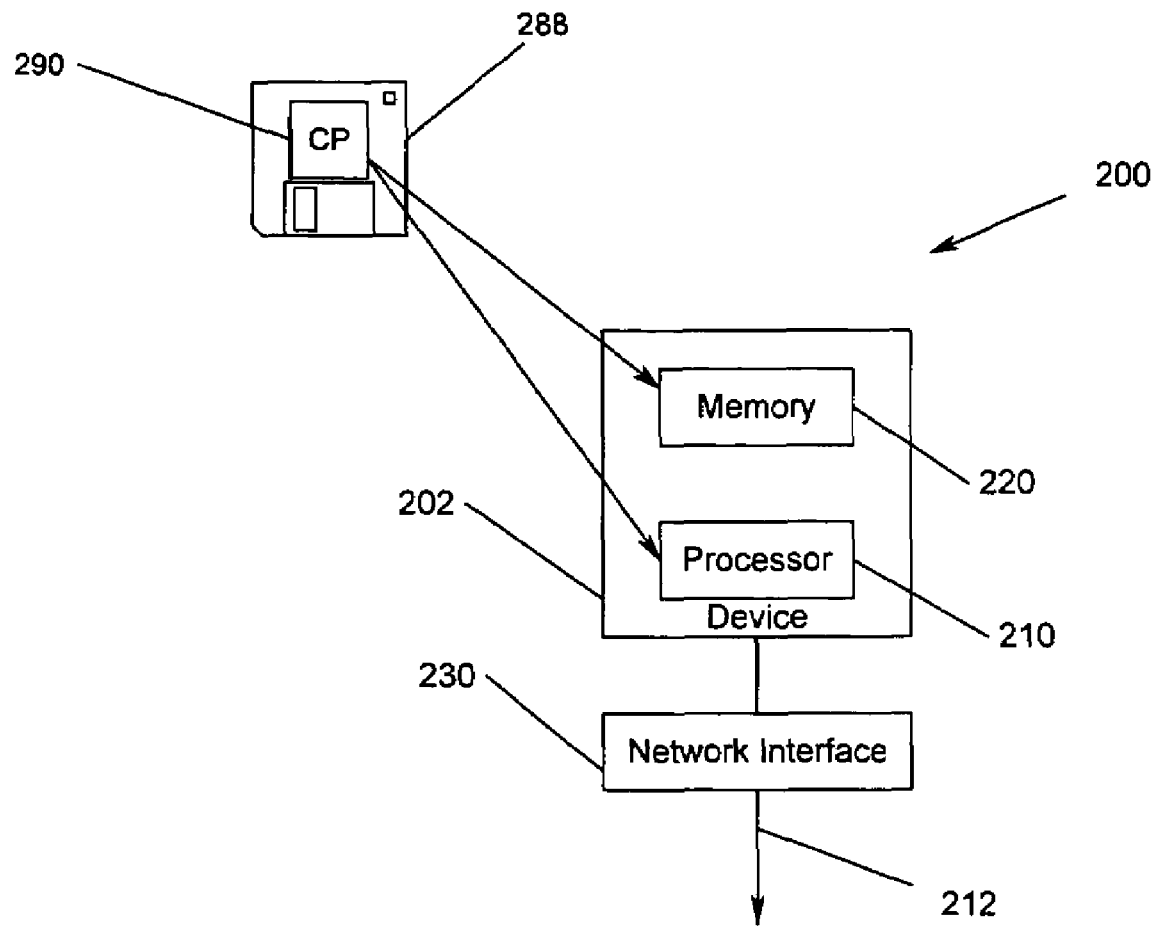
FIG. 2 shows a representative system for providing initiation of remote requested action at remote server through a network connection according to an embodiment of the present invention.

FIG. 2 shows a representative system 200 for providing initiation of remote requested action at remote server through a network connection according to an embodiment of the present invention. The system 200 in FIG. 2 includes a device 202 having a memory 220 and a processor 210. The device 202 may be coupled to a network 212 through a network interface 230.

Referring again to FIG. 1, in one embodiment of the present invention, a remote power reset of the remote server computer system 112 may be performed through an existing TCP/IP network connection 114, 116. For example, when a remote server 112 hangs as result of running out of virtual memory, the operating system 130 can't launch any new processes. However, the remote server 112 is not completely dead. The remote control process 140 continues to run on the remote server 112 because it is pinned to memory 132. A Request TCP/IP packet 160 is used to specify a specific action to be executed by the remote control process 140 at the remote server 112. For example, each process that wants to communicate with another process identifies itself to the TCP/IP protocol suite by one or more ports. Sockets using the TCP protocol are either active or passive. Active sockets initiate connections to passive sockets. By default, TCP sockets are created active. To create a passive socket, the socket is bound with the bind( ) system call, and then the listen( ) system call is used to tell the kernel to start listening for incoming connections to the IP/Port that was bound with the bind( ) system call. The accept( ) call returns control to a program when data arrives on the designated TCP port.

A remote control process 140 for performing remote power reset in response to the Request TCP/IP packet 160 is provided on the remote server 112. As mentioned above, the remote control process 140 for performing the action requested by a user 120 requires very little memory and is pinned to memory 132. Thus, the process for performing the remote control process 140 is still executable in a frozen server. The remote control process 140 listens to a TCP/IP port 150 on the remote server 112. For example, when the remote server 112 hangs, it is possible to send a Request TCP packet 160 to the hung remote server 112 from the host computer system 110, which may be another server connected to the same network 118. The remote control process 140 receives the Request TCP packet 160 and performs an action specified in the Request TCP packet 160 after authentication. For example, the remote control process 140 may perform a system call in order to reboot or power off the remote server 112 if the request is made by the host in the Request TCP packet 160. Thus, the process for performing remote request process 140 doesn't require any additional hardware and is compatible with wide range of servers.

Figure 3:
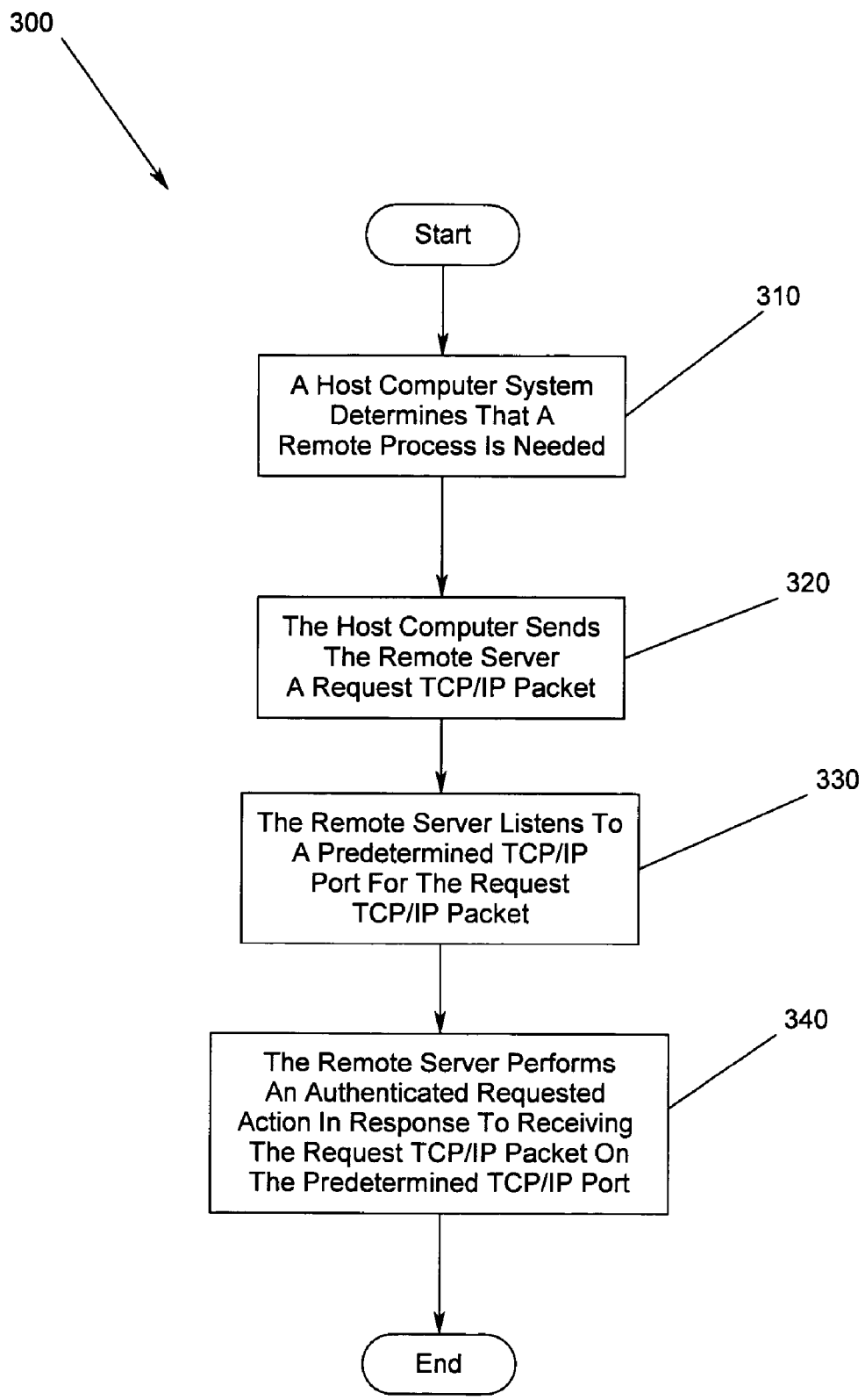
FIG. 3 is a flow chart of the method for providing remote power reset of a server through a network connection according to an embodiment of the present invention.

FIG. 3 is a flow chart 300 of a method for providing remote power reset of a server through a network connection according to an embodiment of the present invention. The host computer system determines that a remote process needs to be performed at a remote server 310. For example, the host computer system may detect that the remote server is hung. The remote server is assumed to be hung if it is not responding to service requests, e.g., the user can't login, the server is not responding, the server is reported down by monitoring tools, etc. In any such situation, the system administrator decides that the server is down and that a reboot is required. However, those skilled in the art will recognize that the remote process may be used even if the server is not hung.

The host computer sends the remote server a Request TCP/IP packet 320 identifying a specific action that the user wants to have performed at the remote server. The remote server listens to a predetermined TCP/IP port for the Request TCP/IP packet 330. The remote server performs a requested action, e.g., a power reset or a system reboot, in response to receiving the Request TCP/IP packet on the predetermined TCP/IP port and checking its authentication 340. For example, to perform the power reset a remote process in the remote server performs a system call to reboot or power off the remote server.

Figure 4:
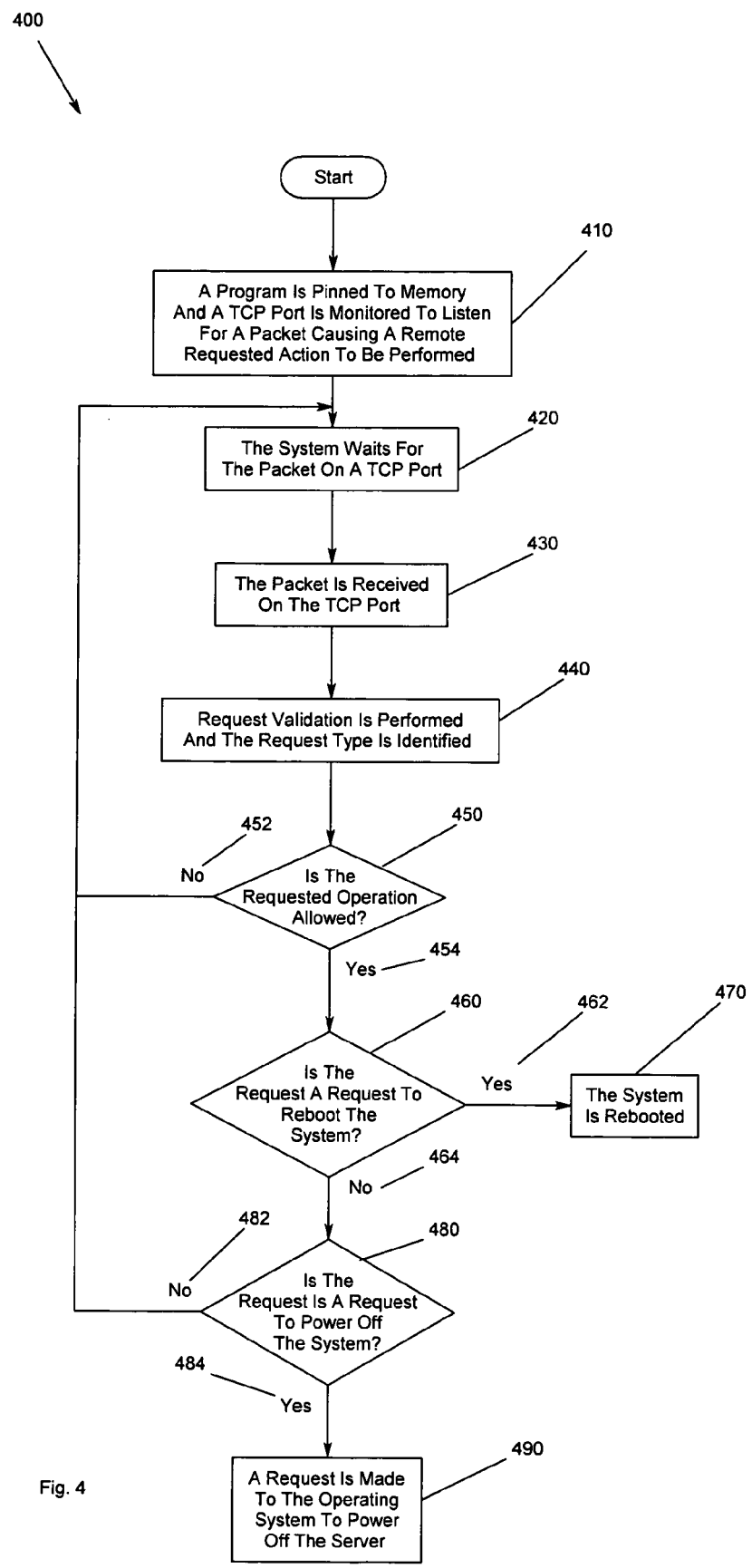
FIG. 4 is a flow chart of a method for providing remote requested action via a remote server according to an embodiment of the present invention.

A remote requested action may be initiated at least via a remote server or an administration server. FIG. 4 is a flow chart 400 of a method for providing remote requested action via a remote server according to an embodiment of the present invention. In FIG. 4, a program is pinned to memory and a TCP port is monitored to listen for a packet causing a remote requested action to be performed 410. A program may be pinned to memory using for example a subroutine that allows a calling process to lock or unlock its text region (text lock), its data region (data lock), or both its text and data regions (process lock) into memory. The subroutine does not lock the shared text segment or any shared data segments. Locked segments are pinned in memory and are immune to all routine paging. Memory locked by a parent process is not inherited by the children after a fork subroutine call. Likewise, locked memory is unlocked if a process executes one of the exec subroutines. The calling process must have the root user authority to use this subroutine. Further, a real-time process can use this subroutine to ensure that its code, data, and stack are always resident in memory. The process must always reside in memory. However, those skilled in the art will recognize that the method for maintaining the process in memory depends on the operating system.

The system waits for the packet on a TCP port 420. The packet is received on the TCP port 430. Request validation is performed and the request type is identified 440. A determination is made whether the requested operation is allowed 450. If not 452, the system cycles back to wait for a packet on the TCP port 420. If the requested operation is allowed 454, a determination is made whether the request is a request to reboot the system 460. If yes 462, the system is rebooted 470. If not 464, a determination is made whether the request is a request to power off the system 480. If not 482, the system cycles back to wait for a packet on the TCP port 420. If yes 484, a request is made to the operating system to power off the server 490.

Figure 5:
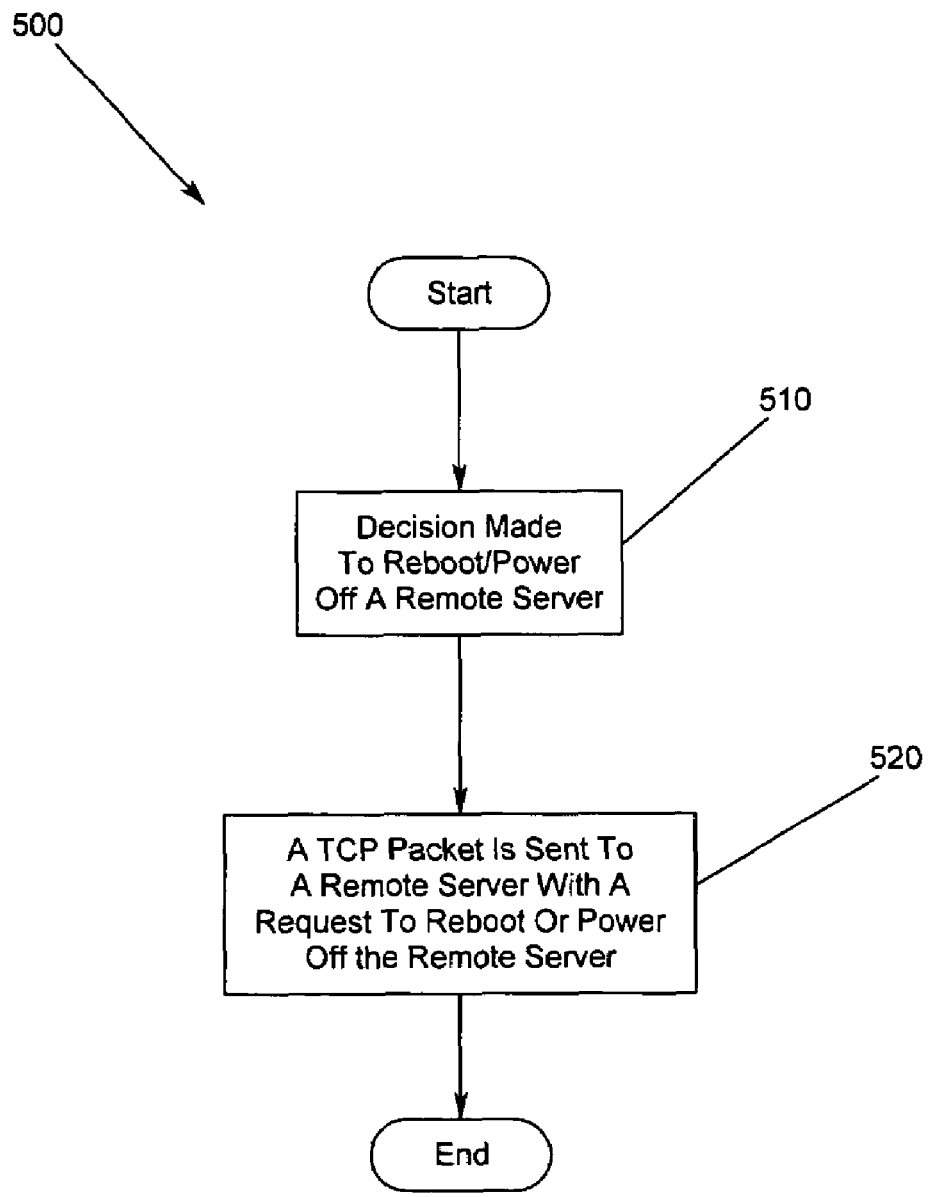
FIG. 5 is a flow chart of a method for providing remote requested action via an administration server according to an embodiment of the present invention.

FIG. 5 is a flow chart 500 of a method for providing remote requested action via an administration server according to an embodiment of the present invention. In FIG. 5, a decision is made to reboot or power off a remote server 510. A TCP packet is sent to a remote server with a request to reboot or power off the remote server 520.

The process illustrated with reference to FIGS. 1-5 may be tangibly embodied in a computer-readable medium or carrier, e.g. one or more of the fixed and/or removable data storage devices 288 illustrated in FIG. 2 or other data storage or data communications devices. The computer program 290 may be loaded into memory 220 to configure the processor 210 for execution of the computer program 290, or may be loaded directly into the processor 210. The computer program 290 include instructions which, when read and executed by a processor 210 of FIG. 2, causes the devices to perform the steps necessary to execute the steps or elements of an embodiment of the present invention.

Further, the present invention is not meant to be limited to the particular method described with reference to FIGS. 3-5. Rather, the method described with reference to FIG. 3-5 represent only a few examples of methods for performing a remote action at a remote server according to an embodiment of the present invention. For example, those skilled in the art will recognize that the present invention is not meant to be limited to any particular type of call to the remote process running on the remote server.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for performing a remote power reset at a remote server through a network connection, comprising:

pinning a power reset procedure to memory at a remote server; and continuously running the power reset procedure to listen for a call to initiate a power reset in response thereto.

2. The method of claim 1, wherein the listening for a call further comprises listening for a Request TCP/IP packet to initiate the power reset.

3. The method of claim 2, wherein the listening for a call further comprises listening for a call via a network connection.

4. The method of claim 1, wherein the listening for a call further comprises listening for a call via a network connection.

5. The method of claim 1, wherein the listening for a call further comprises listening to a predetermined TCP/IP port for a Request TCP/IP packet specifying the power reset procedure.

6. The method of claim 5 further comprising receiving at the predetermined TCP/IP port the Request TCP/IP packet and initiating the power reset procedure pinned in the memory of the remote server in response to receipt of the Request TCP/IP packet.

7. The method of claim 6, wherein the initiating the power reset further comprises performing a system call to reboot or power off the remote server.

8. The method of claim 6, wherein the remote server hangs as result of running out of virtual memory, and wherein the initiating the power reset further comprises unhanging the remote server using the power reset procedure.

9. A remote server, comprising:
a memory for storing program instructions, a power reset procedure being pinned to the memory; and
a processor configured according to the program instructions for running the power reset procedure to listen for a call to initiate a power reset in response thereto.

10. The remote server of claim 9, wherein the call comprises a Request TCP/IP packet for initiating the power reset.

11. The remote server of claim 9, wherein the processor listens for the call via a network connection.

12. The remote server of claim 9, wherein the processor listens for a call by listening to a predetermined TCP/IP port for a Request TCP/IP packet specifying the power reset procedure.

13. The remote server of claim 12, wherein the processor receives the Request TCP/IP packet from predetermined TCP/IP port and initiates the power reset procedure pinned in the memory in response to the Request TCP/IP packet.

14. The remote server of claim 13, wherein the processor initiates the power reset by performing a system call to reboot or power off the remote server.

15. A remote server, comprising:
means for storing program instructions, a power reset procedure being pinned to a memory; and
means configured according to the program instructions for running the power reset procedure to listen for a call to initiate a power reset in response thereto.

16. A program storage device readable by a computer, the program storage device tangibly embodying one or more programs of instructions executable by the computer to perform a method for performing a remote power reset at a remote server through a network connection, the method comprising:
pinning a power reset procedure to memory at a remote server; and
continuously running the power reset procedure to listen for a call to initiate a power reset in response thereto.

* * * * *